A. Y. DAVIS.
CAR WHEEL ASSEMBLY.
APPLICATION FILED JULY 30, 1920.

1,357,226.

Patented Nov. 2, 1920.

Inventor:
Alpha Y. Davis
By Gillson & Gillson
Attys.

UNITED STATES PATENT OFFICE.

ALPHA Y. DAVIS, OF CHICAGO, ILLINOIS.

CAR-WHEEL ASSEMBLY.

1,357,226.   Specification of Letters Patent.   Patented Nov. 2, 1920.

Application filed July 30, 1920. Serial No. 400,193.

*To all whom it may concern:*

Be it known that I, ALPHA Y. DAVIS, a citizen of the United States, and resident of Chicago, county of Cook, and State of Illinois, have invented certain new and useful Improvements in Car-Wheel Assembly, of which the following is a specification and which are illustrated in the accompanying drawings, forming a part thereof.

The invention relates to wheels for railway cars and has for its object to provide an assembly of companion wheel centers and associated axle with preferably both journals and tires removably applied thereto.

In the accompanying drawings;—

Figure 1:
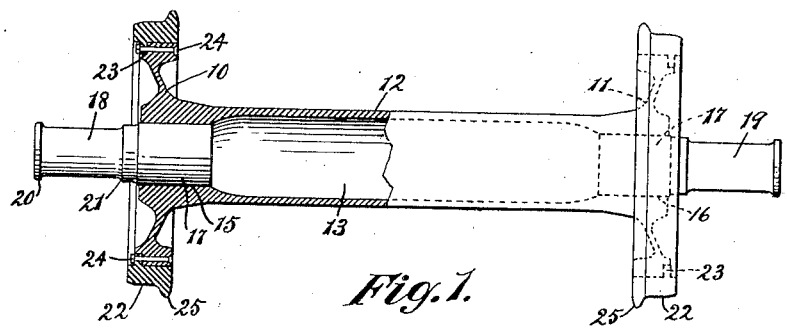
Figure 1 is an elevation of a preferred embodiment of the invention, partly in section.
Figure 2:
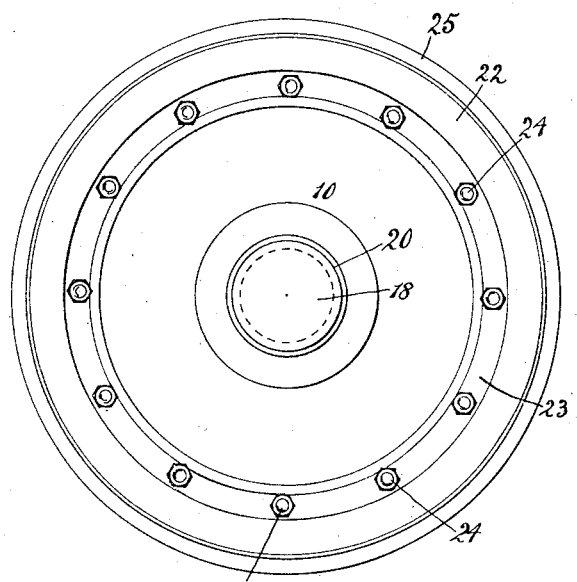
Fig. 2 is an end view of the same.
Figure 3:
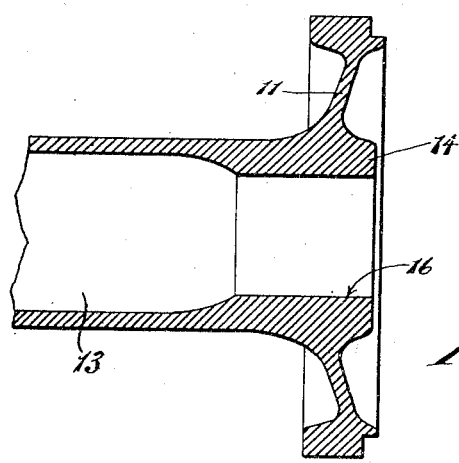
Fig. 3 is a detail sectional view showing one of the wheel centers and the adjacent part of the axle.

An important feature in the construction of railway rolling stock is that the distance between the corresponding wheels at the two sides of the train should be maintained uniform at all times. In the particular construction illustrated in the accompanying drawings, this is insured by forming the companion wheel centers 10 and 11 in one piece with the associated axle 12. As shown, the axle 12 is tubular and its bore 13 opens centrally through the hub, as 14, of each wheel center 10 and 11 forming sockets 15, 16, into which the shanks, as 17, of separate journals 18 and 19 may be entered.

While the particular manner in which the separate journals 18 and 19 are detachably connected with the corresponding wheel centers 10 and 11 is unimportant, the arrangement illustrated contemplates that the shanks 17 of the separate journals 18 and 19 may be forced into the corresponding sockets 15 and 16 in accordance with the common practice employed in pressing the shanks of locomotive wrist pins into the sockets commonly provided therefor in driving wheel centers. It follows that if either journal 18 or 19 becomes worn in use beyond the limits permitted, it may be readily replaced without discarding more material than is comprised in the said journal and its shank 17. Furthermore, the said journals 18 and 19 may be formed from alloy steel without the use of this expensive material between the wheel centers 10 and 11 where its presence is not required and they may be hardened by heat treatment, if desired. Similarly, the associated wheel centers 10, 11, and axle 12 may be adapted for use under cars of different sizes by the application thereto of journals 18, 19 of appropriate specifications as to diameter and length between the collar 20 and fillet 21.

Since car wheels are subjected to wear only upon their treads and flanges, the wheel centers 10 and 11 are preferably each equipped with a removable steel tire 22. These tires may be secured upon the corresponding wheel centers in any convenient manner. In the arrangement illustrated each tire 22 is formed with an integral instanding rib 23 and this rib is apertured at intervals for the introduction of fastening bolts 24 which also pass through the corresponding wheel centers 10 or 11. The steel tires 22 are formed as usual with the customary flanges 25 and the length of the axle 12 is, of course, designed to maintain the proper distance between the treads of the tires applied to the two wheel centers 10 and 11. Should either tire become worn or defective it can be replaced without renewing any other part of the structure.

When the axle 12 is of tubular form, as shown, with its bore 13 opening at each end through the corresponding wheel center 10, 11, the integral structure comprising the said axle and two wheel centers may be readily cast from the mild steel commonly employed in making cast steel engine frames and the like, and requires finishing only upon the peripheries of the wheel centers and upon the walls of the sockets 15 and 16. While, as shown, the said axle 12 and wheel centers 10, 11, are formed integral and are described as being preferably made from cast metal, it will be understood that these parts may be separately formed in any convenient manner and from any appropriate material and thereafter suitably connected.

I claim as my invention:

1. A car wheel assembly comprising, in combination, a pair of companion wheel centers and the associated axle all formed intergral and a car wheel journal and a flanged steel tire removably applied to each wheel center.

2. A car wheel assembly comprising, in combination, a pair of companion wheel centers and a tubular axle connecting the same all formed integral and with the bore of the axle opening centrally through each wheel center, and a pair of separate car wheel journals each removably entered in the said central opening of one of the wheel centers and projecting outwardly beyond the same.

3. A car wheel assembly comprising, in combination, a pair of companion wheel centers and the associated axle all formed integral and constructed for removable application thereto of separate car wheel journals.

4. A car wheel assembly comprising, in combination, a pair of companion wheel centers and a tubular axle connecting the same all formed integral and with the bore of the axle opening centrally through each wheel center to provide a socket for removably receiving the shank of a separate car wheel journal.

5. A car wheel assembly comprising the combination with companion wheel centers and the associated axle connecting the same, of separate car wheel journals and flanged steel tires removably applied to each wheel center.

6. In combination, a pair of companion car wheel centers each having an outwardly facing central socket, an axle connecting the wheel centers, a pair of separate car wheel journals each pressed into the said central socket of one of the wheel centers and projecting outwardly therefrom and a steel tire removably applied to each wheel center.

ALPHA Y. DAVIS.